United States Patent [19]

Campbell

[11] Patent Number: 5,217,939
[45] Date of Patent: Jun. 8, 1993

[54] CATALYST FOR THE PRDUCTION OF NITRIC ACID BY OXIDATION OF AMMONIA

[75] Inventor: Larry E. Campbell, Knoxville, Tenn.

[73] Assignee: Scientific Design Company, Inc., Little Ferry, N.J.

[21] Appl. No.: 881,073

[22] Filed: May 11, 1992

[51] Int. Cl.$^5$ .................. B01J 23/40; B01J 23/42; B01J 37/02; B01J 32/00

[52] U.S. Cl. .................. 502/339; 502/325; 502/439; 502/527; 423/392

[58] Field of Search ............... 502/339, 326, 325, 439, 502/527; 423/392

[56] References Cited

U.S. PATENT DOCUMENTS

| | | | |
|---|---|---|---|
| 3,660,024 | 5/1972 | Gillespie | 502/527 X |
| 3,900,646 | 8/1975 | Clyde | 427/55 |
| 3,904,553 | 9/1975 | Campbell et al. | 252/465 |
| 3,957,685 | 5/1976 | Heide et al. | 502/10 |
| 3,972,834 | 8/1976 | Washbourne | 502/200 |
| 3,998,758 | 12/1976 | Clyde | 502/307 |
| 4,088,607 | 8/1978 | Weidenbach et al. | 502/329 |
| 4,233,185 | 11/1980 | Knapton et al. | 502/339 X |
| 4,251,239 | 2/1981 | Clyde et al. | 55/132 |
| 4,253,302 | 3/1981 | Asano et al. | 60/276 |
| 4,308,233 | 12/1981 | Narumiya | 422/502 |
| 4,465,458 | 8/1984 | Nishino | 431/208 |
| 4,568,595 | 2/1986 | Morris | 428/116 |
| 4,792,435 | 12/1988 | Nakajimo | 422/110 |
| 4,810,685 | 3/1989 | Twigg et al. | 502/60 |
| 4,863,712 | 9/1989 | Twigg et al. | 423/651 |
| 4,863,893 | 5/1989 | Farranto et al. | 502/325 |

OTHER PUBLICATIONS

Farranto, et al., "Ammonia Oxidation Catalyst with Enhanced Activity", *Ind. Eng. Chem Res.* vol. 29, No. 7, 1990, pp. 1125-1129.

*Primary Examiner*—W. J. Shine
*Assistant Examiner*—Douglas J. McGinty
*Attorney, Agent, or Firm*—Kenneth H. Johnson

[57] ABSTRACT

Reticulated ceramic or metal substrate coated with Cobalt compounds, noble metals or mixtures thereof are superior catalysts for the oxidation of ammonia to produce nitric oxide.

14 Claims, No Drawings

CATALYST FOR THE PRDUCTION OF NITRIC ACID BY OXIDATION OF AMMONIA

BACKGROUND OF THE INVENTION

1. Field of The Invention

The present invention relates to a novel catalyst structure and the process for the preparation of nitric acid employing the structure.

2. Relevant Art

Nitric acid is made by oxidizing ammonia over a wire mesh gauze catalyst produced by weaving wires of precious metals (e.g. platinum, Ostwald process) and their alloys. The process operates at temperatures from 800° to 1100° C. The hot nitric oxide formed is quenched and air is added so the nitric oxide oxidizes to $NO_2$ (nitrogen (IV) oxides) which reacts with water to form nitric acid. The wire mesh gauze is alloyed to increase high temperature strength and to reduce costs. Typically, platinum is used as the primary catalyst and is alloyed with ruthenium to improve high temperature strength and palladium to reduce costs. The prior art in the nitric acid process, determined that a mass of catalytic material, e.g., platinum was necessary because of the continual erosion of the platinum by volatilization.

Ammonia oxidation catalysts for nitric acid production are based on precious metal fine wires woven together on a loom into the form of a gauze. The typical gauze contains 1.78 troy ounces of platinum or precious metal alloy per square foot. For some plants as many as 27-30 of these gauzes each 60 to 120 inches in diameter may be stacked. These gauzes will last for six weeks to a year depending on the severity of use (high pressure versus low pressure) and can fail for as variety of reasons including burn through (caused by channeling or difficult start up) and loss of platinum metal due to volatilization.

The conventional catalysts are fragile and lose platinum at high temperature via $PtO_2$ volatilization. Other gauzes (getter gauzes) are used downstream to capture the volatile platinum species through a collection and reduction process.

The gauze catalysts are composed of screens with 3 to 30 stacked screens used. A high pressure oxidation process requires more screens and results in higher losses of platinum metal. This stacked screen configuration is dimensionally unstable in that it expands and sags and allows non-uniform flow and temperature distribution and poor mixing.

Fine wires are desired for improved catalyst performance but result in poor physical integrity and reduced life. The problems with the platinum metal alloy gauzes begin at start-up. It has been concluded that this reaction carried out over precious metal mesh is mass transfer limited. Most gauze reactors are over designed in terms of the number of gauzes. The over design is required to compensate for poor utilization of catalyst due to poor flow distribution. Poor flow distribution due to non uniformity and low pressure drop causes "flickering", a condition in which increased flow through a gauze section can release more heat. These high temperature "hot spots" can lose platinum as the oxide at the higher temperature. The non uniformity and low pressure drop of gauzes gives rise to additional loss of efficiency if the gases are not thoroughly mixed, as little additional mixing is achieved by the gauze catalyst structure.

One attempt to solve the platinum loss is shown in U.S. Pat. No. 4,863,893. Another approach is described by Robert J. Farrauto and Hgo C. Lee in "Ammonia Oxidation Catalyst with Enhanced Activity", Ind. Eng. Chem. Res. Vol. 29, No. 7, 1990, pages 1125-1129 where high surface area is obtained by depositing platinum from solution on the platinum alloy gauze.

Ceramics and many metals are strong, resistant to corrosion, resistant to relatively high temperatures and would generally be desirable as structural materials in the nitric acid process and may be used in various components. Conventional ceramics were not suitable because of insufficient porosity and an insufficient quantity of platinum to allow for volatilization loss.

In several full size industrial reactors reticulated ceramic foam structures have been successfully tested as a flow distributor, thermal radiation guard and physical support. These guard beds have been shown to improve the life of the gauze and performance and to withstand the harsh chemical environment and high reaction temperature. The foams can be produced in a variety of cell densities with the most common being in the range of 10 to 70 pores per linear inch.

Reticulated ceramics and metals have been employed as filters, scrubbers, packing supports and more recently in automobile catalytic exhaust converters. The reticulated ceramics were initially developed for filtration of molten metals.

Various reticulated ceramic structures are described in the art: U.S. Pat. No. 4,251,239 discloses flutted filter of porous ceramic having increased surface area; U.S. Pat. No. 4,568,595 discloses reticulated ceramic foams with a surface having a ceramic sintered coating closing off the cells; U.S. Pat. No. 3,900,646 discloses ceramic foam with a nickel coating followed by platinum deposited in a vapor process; U.S. Pat. No. 3,957,685 discloses nickel or palladium coated on a negative image ceramic metal/ceramic or metal foam; U.S. Pat. No. 3,998,758 discloses ceramic foam with nickel, cobalt or copper deposited in two layers with the second layer reinforced with aluminum, magnesium or zinc; U.S. Pat. No. 4,863,712 discloses a negative image reticulated foam coated with cobalt, nickel or molybdenum coating; U.S. Pat. No. 4,308,233 discloses a reticulated ceramic foam having an activated alumina coating and a noble metal coating useful as an exhaust gas catalyst; U.S. Pat. No. 4,253,302 discloses a foamed ceramic containing platinum/rhodium catalyst for exhaust gas catalyst; and U.S. Pat. No. 4,088,607 discloses a ceramic foam having an active aluminum oxide layer coated by a noble metal containing composition such as zinc oxide, platinum and palladium.

Catalyst sites for precious metals are maximized by deposition of small crystallites, usually from solution. The use of chlorination to produce precious metal solutions is universal. Many catalysts are produced from these chloride solutions via hydrolysis or precipitation and in some cases by drying and thermal reduction. In all these cases there are residual halides.

Certain gaseous species can adsorb so strongly that they tie up the sites preventing catalysis or in some cases the adsorbed species react with the surface sites to form new chemical compounds which may undergo structural (chemical and physical) change. Examples of these type of poisons are $SO_2$, $Cl_2$, $H_2S$, $I_2$, $F_2$, etc.

Improved catalysts have previously been found which are prepared from chloride free solutions. Examples are nitrates of palladium and rhodium and the hexa hydroxy platinates and platinum sulfito complexes.

It is an advantage of the present invention to provide an improved catalyst for ammonia oxidation with increased performance (yield and selectivity), longer life and with greatly reduced costs by depositing metallic catalysts on ceramic or metallic structures, which are better able to withstand upsets and not result in burn through.

It is a further advantage that the reticulated structure provides high surface area and uniform and controllable porosity. These properties give excellent gas contacting and uniform pressure drop which can be critical for good catalyst performance for ammonia oxidation. Furthermore, the reticulated structure provides a structure which presents a surface of catalytic material but unlike the wire gauze catalyst the inner core is inert material and not costly and inaccessible precious metal.

It is a feature of the present invention that catalysts in which the precious metals are produced from metallo organic compounds dissolved in organic solvents which have superior catalytic activity (conversion at lower temperature) and stability. These catalysts have superior properties to those produced by known and practiced technology based on inorganic chloride or chloride free aqueous compounds.

SUMMARY OF THE INVENTION

Briefly the present invention relates to a novel ammonia oxidation catalyst structure comprising a reticulated ceramic or metal substrate coated with from 1 to 70 weight percent based on the total catalyst structure cobalt compounds or a noble metal, the method of making the catalyst and the process of oxidizing ammonia by contacting ammonia and a free oxygen containing gas in vapor phase at temperatures in the range of 700° to 1200° C. (exit temperature), in a fixed bed of the catalyst. The noble metal preferably comprises 2 to 50 wt. % based on the total catalyst structure. A cobalt coating preferably requires more of the active metal component, i.e. about 10 to 70 weight percent, more preferably 15 to 50 weight percent, e.g. 15 to 30 weight percent, based on the total catalyst structure.

The novel catalyst structures of the present invention may be prepared by immersing a foamed ceramic structure or foamed metal structure in a solution comprising an organic solvent and from about 1 to 30 wt. % of a carboxylate salt of cobalt, noble metal or mixture thereof. The desired amount of metal salt is preferably deposited by sequential immersion of the foamed structure followed by firing at 260° to 800° C., for a sufficient time to reduce the salt, e.g. 30 to 90 minutes and repeating these steps as required.

The active precious metal coating of the freshly prepared catalyst structure is substantially continuous and exhibits electrical conductivity. The manner of application from an organic metal solution provides an even distribution throughout the reticulated substrate structure. Preferably the noble metal comprises platinum, palladium, rhodium, ruthenium, osmium and mixtures thereof. The catalyst may be an alloy of platinum. The freshly prepared catalyst may be characterized as continuous and electrically conductive, but after use the coating is characterized as crystallized and non-conductive.

Another feature of ceramic foam based catalysts, is that they have substantially higher thermal mass (heat capacity per unit of surface area) than platinum gauzes of equal surface area. The higher thermal mass of ceramic foam allows it to attenuate local disturbances which can lead to flickering. Therefore, reducing hot spots and the loss of platinum to oxidation at higher temperatures.

DETAILED DESCRIPTION OF PREFERRED EMBODIMENTS

The ceramic foam structure and the method of production does not need to be described here. For example reticulated ceramic foams are available from Selee Corporation of Hendersonville, N.C., Hi-Tech Ceramic of Alfred, N.Y. and Foesco, Inc.

Generally, the GHSV will be between about 100,000 and 5,000,000. Contact times are extremely brief from about 0.002 second. The contact time is the calculated dwell time of the reaction mixture in the reaction zone, assuming the moles of feed mixture. For the purpose of calculating residence times, the reaction zone is the portion of the reactor containing catalyst. In calculating space velocities, the volume of a fixed bed zone containing catalyst is that original void volume of reactor space containing catalyst. The gaseous hourly space velocity (GHSV) is the volume of the ammonia to be oxidized, in the form of vapor calculated under standard conditions of 25° C. and 760 mm. of mercury, per volume of reactor space containing catalyst per hour.

The foam structure is characterized by the number of pores per linear inch and typical foams are produced with 10 to 100 pores per linear inch. Table 1 below shows the comparisons of geometrical surface area or global surface area for typical wire gauzes and the foam structures of this invention. Specifically Table 1 shows the surface area of the gauzes per unit area and the thickness of foam structure which would be required to be equal to this surface area. A comparison of other properties of the foams and gauzes are shown in Tables 2 and 3.

TABLE 1

| Surface Area of Gauzes and Foams | | |
|---|---|---|
| Gauze (Prior Art) | | |
| Mesh | Wire Diameter | Surface Area (sq m/square m) |
| 40 | 0.005 inches | 1.29 |
| 80 | 0.003 | 1.53 |

| Foam (Invention) | | |
|---|---|---|
| | | Foam Thickness[1] (cm) |
| Pore Density | Surface Area (sq m/cubic m) | Eq for 40 / Eq for 80 |
| 10 | 667 | 0.193 / 0.229 |
| 20 | 1334 | 0.097 / 0.114 |
| 30 | 2001 | 0.064 / 0.076 |
| 40 | 2668 | 0.048 / 0.057 |
| 50 | 3335 | 0.039 / 0.046 |

[1]The thickness of foam required to give the same global area of one gauze either 40 or 80 mesh.

To produce the catalysts structures of this invention the above mentioned structures are coated with metallo organic compounds of certain precious metals and base metals to produce catalysts which have the structure of the foam and smooth and substantially continuous catalytic surfaces.

Preferable metal compounds for deposition on to the foamed structure are the carboxylates, preferably corresponding to long chain acid being 4 to 20 carbon atoms, such as platinum neo decanoate, platinum 2 ethyl hexanoate, palladium neo decanoate and palladium 2-ethyl hexanoate. The same salts of rhodium and silver have also shown excellent results of uniform, distribution and high metal dispersion. While the chemistry of metal carboxylates have been known for some time the precious metal compounds have not been available in sufficient purity or quantity until recently. It was not obvious that these materials could be decomposed to form good catalytic precursors or that these precursors would have enhanced dispersion in the absence of halogen or hydroxide species.

Generally any organic liquid in which the metal salt is soluble may be used. Suitable solvents for the metal salt component of the depositing solution include aromatics having 6 to 12 carbon atoms, lower alcohols having 1 to 8 carbon atoms, symmetrical and unsymmetrical ketones and ethers having 3 to 9 carbon atoms and linear esters having 3 to 7 carbon atoms. Preferred solvents for the cobalt and noble metal carboxylates include aromatics such as toluene and xylene, alcohols such as ethanol, isopropanol and butanol, ketones like methyl ethyl ketone, acetone, ethers such as methyl tertiary butyl ether tertiary amyl methyl ether and esters like propyl acetate, and ethyl acetate.

When platinum is deposited on ceramic foam from the ethyl hexanoate salt dissolved in toluene a metallic film is formed. After heating to 500° F. the conductivity can be measured with an ohm meter. For example, when a one inch thick 30 cell per linear inch alumina ceramic foam is coated with approximately 10% platinum by weight the resistance was measured at an average of 4.4 ohms across the thickness. The ceramic piece was about 12 inches on the diagonal distance. The resistance across this diagonal was measured at an average 6 ohms.

Note that after exposure to temperatures in excess of 800° C. the films are optically continuous but have no electrical continuity.

The following examples are intended to demonstrate the invention.

Example 1

A foam structure 8 inches in diameter and 0.8 inches thick and containing 30 pores per inch was produced by immersing a polyurethane expanded foam into a ceramic slurry of alpha alumina powder. After firing to temperatures in excess of 1400° C. the foam was dipped into a solution of 11% platinum as platinum ethylhexanoate in toluene. After three dips with intermittent drying and firings the foam contained 10.5 wt. % platinum or 1.38 troy ounces. This foam was placed into a small ammonia oxidation reactor and 6.7 volume % ammonia in air was passed over the platinum coated foam. The mixture was ignited with a spark ignitor. After a short time, the entire structure glowed reddish orange. The concentration of the input ammonia was confirmed at 6.7 volume % by drawing a gas sample and analyzing by wet chemical methods. Several samples were taken of the gases after the foam oxidation catalyst and the yield (selectivity x conversion) was found to be 96 mole % in the form of nitric oxide (NO). This catalyst was left in place and was operated intermittently for over 90 days. The catalyst was removed for characterization. There was no metal lost and the assay of the Pt was still 10.5%.

Example 2

The reactor of example 1 was fitted with 15 layers of Pt/Rh gauze weighing a total of 9.94 troy ounces. Ammonia in air was passed over the gauze and the analysis showed 95 mole % conversion of the ammonia to nitric oxide.

Example 3

Several ceramic foams catalyst supports were made by dipping 20 and 30 ppi (pores per inch) polyurethane foam 1 inch thick and 8 inches in diameter into a slurry of mullite (alumina silicate) powder. After firing to temperatures in excess of 1200° C., strong ceramic foam structures resulted. These structures were dipped in accordance with the procedure in example 1, into a 8% Pt as platinum ethylhexanoate dissolved in toluene. One foam, 30 ppi, was dipped once and was found to have picked up approximately 3% or 0.37 troy ounces of Pt. A second foam, 20 ppi, was coated with four dips and was found to have picked up 1.54 troy ounces or about 12% by weight.

The 3 wt. % Pt on mullite foam was tested in the ammonia oxidation reactor with 10 volume % ammonia. The conversion to NO was found to be 93-95 mole % as determined by chemilumenescent analysis.

The 12 wt. % Pt on 20 ppi foam was tested in the ammonia oxidation reactor and the ammonia in and the NO out were measured by a chemiluminescence. The conversion was found to be between 97 and 100%.

Example 4

A foam structure 8 inches in diameter and 0.8 inches thick and containing 30 pores per inch was produced by immersing a polyurethane expanded foam into a ceramic slurry of cordierite (magnesia alumina silicate) powder. After firing to temperatures in excess of 1300° C. the ceramic foam was dipped into an aqueous colloidal dispersion of alumina containing about 20% by weight of $Al_2O_3$. The sample was dried and calcined to 500° C. for one hour. The foam was found to have picked up 8% by weight alumina. The alumina coated foam was dipped onto a solution of 12% zinc as zinc neo decanoate in toluene. The weight pick up measured after calcination to 500° C. was 5%. This zinc oxide and alumina coated foam was then dipped into a 12% cobalt as cobalt neo decanoate in toluene and dried and calcined at 500° C. The weight pick up was 15% as cobalt oxide. This catalyst was placed in the ammonia oxidation reactor and ignited with the electric spark ignitor. The reactor was run for two weeks before evaluation. Analysis of the ammonia input to the reactor showed 10% ammonia in air. The output was measured at between 9.1 and 9.4% NO giving a corrected conversion of 92 to 95%.

Pilot Plant Trial Experience (comparison with Pt gauze)

The reactor chamber of the pilot unit utilizes 16, 8 inch diameter gauzes. The flow rate is 600 scfm which gives a linear velocity of 1.355 meters per second and an approximate pressure drop of 1.9 inches of water. The feed is approximately 6.7% ammonia in air. The reactor operates at 4 psig and atmospheric pressure is about 13 psig.

A platinum catalyst on foam was prepared with 10.5% Pt on an 8 inch diameter 0.80 inches thick, 30 pores per linear inch alumina foam. This catalyst loading had a platinum loading of 1.38 troy ounces in the reactor. (The metal contained in the gauzes pack was 9.94 troy ounces.) At this metal loading the metallized ceramic catalyst is electrically conductive with a resistance of about 0.4 ohms per inch. This metallized foam was placed on a non metallized alumina support segment and mounted in the reactor. The gauze reactor was operated at 760°-800° C.

The performance of the catalyst was checked by taking samples of the reacted gases and titrating for nitric acid and ammonia. Twelve samples were taken over a six hour run. The results showed that the gauze converted 95% of the ammonia to nitric acid and furthermore in the absorption system used approximately 45-46% acid was produced. The metallized foam converted up to 96% of the ammonia to nitric acid and for unexplained reasons gave a stronger acid strength of about 50%. After these tests were completed only the acid strength was used to monitor the performance and nitric acid was produced for an additional 60 days. At the end of the 60 days, the catalyst was performing acceptably, with no evidence of reduced activity and the run was stopped only to recover the catalyst for analysis. Assay showed that there was no metal loss (assay on 10.50% assay out 10.54%) and there was no loss of performance was detected.

TABLE 2

Comparisons of Foams to Gauze Thickness of Foam to Match Gauze (Surface Area of 80 mesh gauze is 1.53 Square meters of wire per square meter gauze)

| Pores Per Linear Inch | Thickness of Foam | Pressure Drop at 1.355 m/sec. (in $H_2O$) |
| --- | --- | --- |
| 10 | 0.229 cm | 0.72 |
| 20 | 0.114 cm | 1.38 |
| 30 | 0.076 cm | 1.90 |
| 50 | 0.046 cm | 6.11 |

From about 12 to 15% Pt by weight the metallized structure has a continuous and electrically conductive film. The ceramic surface is substantially coated.

Table 3 below shows the platinum reduction achievable by using the coated form. This made possible because the ceramic makes up the core and the platinum is on the surface where it is effective as a catalyst.

TABLE 3

Comparisons of Pt loadings on Gauze and Metallized Ceramic Foams (Coated at 12% by weight) (80 mesh wire gauze has 1.78 troy ounce per square foot of gauze)

| Pores per linear inch | TO/Sq Ft |
| --- | --- |
| 10 | 0.1145 |
| 20 | 0.0572 |
| 30 | 0.0382 |
| 50 | 0.0229 |

It is estimated that the catalysts and process according to the present invention, if substituted for the conventional platinum gauze can reduce the metal content of the catalyst charge over 90%.

The invention claimed is:

1. A catalyst structure for the oxidation of ammonia to produce nitric oxide comprising a substrate of reticulated ceramic foam or reticulated metal foam having a coating consisting essentially of from 1 to 70 weight % noble metal coated substantially uniformly thereover.

2. The catalyst structure according to claim 1 wherein from about 2 to 50 weight % of said noble metal is coated on said substrate.

3. The catalyst structure according to claim 2 wherein is said noble metal is Pt, Pd, Rh, Ru, Os or mixtures thereof.

4. The catalyst structure according to claim 1 wherein said substrate is coated substantially continuously.

5. The catalyst structure according to claim 4 wherein said metal coating on said substrate is electrically conductive.

6. The catalyst structure according to claim 1 wherein said coating comprises platinum.

7. The catalyst structure according to claim 1 wherein said coating comprises an alloy of platinum.

8. The method of preparing a catalyst structure for the oxidation of ammonia to produce nitric oxide comprising a substrate of reticulated ceramic foam or reticulated metal foam having coated substantially uniformly thereover from 1 to 70 weight % cobalt, a noble metal or mixtures thereof comprising:
   (a) preparing a solution comprising an organic solvent and from about 1 to 30 wt. % of a carboxylate salt of noble metal;
   (b) immersing foamed ceramic structure or foamed metal structure in said solution to cover said substrate with said solution;
   (c) removing said solution covered substrate from said solution and
   (c) heating at 260° to 800° C. for a sufficient time to reduce the salt to produce a substantially continuous metal coating over the substrate characterized as electrically conductive.

9. The method according to claim 8 wherein from about 2 to 50 weight % of said noble metal is coated on said substrate.

10. The method according to claim 9 wherein from about 2 to 20 weight % of said noble metal is coated on said substrate.

11. The method according to claim 8 wherein is said noble metal is Pt, Pd, Rh, Ru, Os or mixtures thereof.

12. The method according to claim 8 wherein said coating comprises platinum.

13. The method according to claim 10 wherein said noble metal comprises platinum.

14. The method of preparing a catalyst structure for the oxidation of ammonia to produce nitric oxide comprising a substrate of reticulated ceramic foam or reticulated metal foam having coated substantially uniformly thereover from 1 to 70 weight % cobalt comprising:
   (a) preparing a solution comprising an organic solvent and from about 1 to 30 wt. % of a carboxylate salt of cobalt;
   (b) immersing foamed ceramic structure or foamed metal structure in said solution to cover said substrate with said solution;
   (c) removing said solution covered substrate from said solution and
   (c) heating at 260° to 800° C. for a sufficient time to oxidize the salt to produce a coating over the substrate.

* * * * *